United States Patent Office 3,367,953
Patented Feb. 6, 1968

3,367,953
PREPARATION OF ACYL HALIDES
Louis Schmerling, Riverside, Ill., assignor to Universal Oil Products Company, Des Plaines, Ill., a corporation of Delaware
No Drawing. Filed Nov. 24, 1964, Ser. No. 413,625
11 Claims. (Cl. 260—408)

ABSTRACT OF THE DISCLOSURE

Preparation of acyl halides by reaction of saturated hydrocarbons with carbon tetrahalides and carbon monoxide in the presence of peroxy compounds at about 50–300° C. and about 10–2000 atmosphere pressure.

---

This invention relates to a novel process for the preparation of acyl halides by the halocarbonylation of saturated hydrocarbons.

In general, the acyl halides readily combine with any compound containing a hydrogen atom attached to an oxygen, nitrogen or sulfur atom and are well-known acylating agents for even the more difficultly acylatable compounds. The acyl halides are also well-known analytical agents useful in analytical procedures for the identification and determination of alcohols and primary and secondary amines.

It is an object of this invention to present a process for the conversion of saturated hydrocarbons to acyl halides. In one of its broad aspects the present invention embodies a process for the halocarbonylation of a saturated hydrocarbon to form an acyl halide, which process comprises reacting a carbon tetrahalide, carbon monoxide and a saturated hydrocarbon by heating a mixture of the same together with a free radical generating compound at a temperature at least as high as the decomposition temperature of said free radical generating compound and at a superatmospheric pressure.

Another embodiment is in a process for the halocarbonylation of a saturated hydrocarbon and comprises reacting a carbon tetrahalide, carbon monoxide and a saturated hydrocarbon by heating a mixture of the same together with an acyl peroxide at a temperature of from about 50° C. to about 300° C. and at least as high as the decomposition temperature of said acyl peroxide and at a pressure of from about 10 to about 2000 atmospheres.

One of the more specific embodiments concerns a process for the preparation of 2-methylheptanoyl chloride which comprises reacting carbon tetrachloride, carbon monoxide and n-heptane by heating a mixture of the same together with benzoyl peroxide at a temperature of from about 75° C. to about 225° C. and at a pressure of from about 10 to about 2000 atmospheres.

Other objects and embodiments of this invention will become apparent in the following detailed specification.

In accordance with the process of this invention for the preparation of acyl halides, a saturated hydrocarbon is reacted with a carbon tetrahalide and carbon monoxide. Saturated hydrocarbons containing a tertiary carbon atom are somewhat less reactive than other saturated hydrocarbons. It is contemplated that the reduced activity is due to the relative instability of radicals formed by the combination of carbon monoxide and tertiary alkyl radicals, although it is not intended to limit this invention to any particular theory. Thus, while saturated hydrocarbons in general are operable, the process of this invention finds particular utility in the halocarbonylation of saturated hydrocarbons which do not embody a tertiary carbon atom in their structure.

The saturated hydrocarbon should contain more than two carbon atoms since methane and ethane are relatively unreactive. Suitable hydrocarbons include propane, n-butane, n-pentane, n-heptane, n-tetradecane, cyclopentane, cyclohexane, bicyclo[2.2.1]heptane, adamantane, and the like. It can be seen that the saturated hydrocarbons include aliphatic as well as alicyclic saturated hydrocarbons.

The tetrahalide reactant is preferably carbon tetrachloride, in which case the acyl halide product is an acyl chloride, or carbon tetrabromide, in which case the product is an acyl bromide. Carbon tetrahalides containing bromine and chlorine atoms, for example, bromotrichloromethane, dibromodichloromethane, and chlorotribromomethane may also be utilized. Other carbon tetrahalides comprising fluorine and/or iodine atoms, for example, bromochlorodifluoromethane, dibromochlorofluoromethane, dibromodifluoromethane, dichlorodibromofluoromethane, trifluoroiodomethane, trichloroiodomethane, and the like, are also operable.

Pursuant to the present process, the carbon tetrahalide, carbon monoxide and a saturated hydrocarbon are reacted by heating the same together with a free radical generating compound. Suitable free radical generating compounds include peroxy compounds containing the bivalent —O—O— radical which decompose to form free radicals and initiate the reaction herein contemplated. Examples of such free radical generating compounds include the persulfates, perborates and percarbonates of ammonium and of the alkali metals. Organic peroxy compounds constitute a preferred class of peroxy compounds, particularly acyl peroxides, including aroyl peroxides, like acetyl peroxide, butyryl peroxide, lauroyl peroxide, benzoyl peroxide, diisopropylbenzoyl peroxide, etc., which, upon decomposition, form products which do not effect hydrolysis of the acyl halide product of the process of this invention. Other organic peroxy compounds which can be utilized include peracetic acid, persuccinic acid, dimethyl peroxide, diethyl peroxide, diisopropyl peroxide, di-t-butyl peroxide, tetralin peroxide, urea peroxide, t-butyl perbenzoate, t-butyl hydroperoxide, methylcyclohexyl hydroperoxide, cumene hydroperoxide, methylethylketone peroxide, cyclohexanone peroxide, etc., although decomposition products of peroxides such as those last described tend to hydrolyze the acyl halide products and such peroxides are therefore somewhat less desirable than the aforesaid acyl peroxides. Mixtures of peroxy compounds may be employed, or said peroxy compounds may be utilized in admixture with various non-aqueous diluents. Thus, commercially available organic peroxy compounds compounded with various diluents, including benzoyl peroxide composited with calcium sulfate, benzoyl peroxide compounded with camphor, etc., may be utilized.

The present process is effected at a temperature at least as high as the initial decomposition temperature of the particular free radical generating compound employed. Free radical generating compounds such as peroxy compounds, particularly organic peroxides, decompose at a measurable rate with time in a logarithmic function dependent upon temperature. This rate of decomposition is ordinarily expressed as the half life of the free radical generating compound at a particular temperature. For example, the half life in hours of lauroyl peroxide in paraffin hydrocarbon solvent is 20.6 hours at 60° C., 5.61 hours at 70° C., and 0.76 hour at 85° C. A reaction temperature is selected at which the free radical generating compound will decompose with the generation of sufficient free radicals to initiate the reaction and at which temperature the half life of said compound is such as to cause the reaction to proceed smoothly at a suitable rate. When the half life of the free radical generating compound is greater than about 10 hours, radicals are not generated at a sufficient rate to cause the contemplated reaction to go forward at a satisfactory rate. Thus, the reaction temperature may be within the range of from about 50° C. to about 300° C. and at least as high as the decomposition temperature of the free radical generating compound, by which is meant a temperature such that the half life of the free radical generating compound is usually not greater than 10 hours. Since the half life for each free radical generating compound is different at different temperatures, the exact temperature to be utilized in a particular reaction will vary. However, persons skilled in the art are well acquainted with the half life versus temperature data for different free radical generating compounds. Thus it is within the skill of one familiar with the art to select the particular temperature needed for any particular initiator. However, the operating temperature generally should not exceed the decomposition temperature of the free radical generating compound by substantially more than about 150° C. since free radical generating catalysts decompose rapidly under such high temperature conditions. For example, the half life of benzoyl peroxide is less than 10 hours at 75° C., and therefore when this peroxy compound is used, the reaction temperature is from about 75° C. to about 300° C. but generally lower than about 225° C. A reaction temperature of from about 130° C. to about 280° C. is suitable when the peroxy compound is di-t-butyl peroxide, and from about 110° C. to about 300° C. but generally not in excess of about 260° C., with t-butyl perbenzoate. Higher reaction temperatures may be employed but little advantage is gained if the temperature is in excess of the decomposition temperature of the free radical generating compound by more than about 150° C., as hereinbefore mentioned. The free radical generating compounds can be utilized in relatively low concentration, for example, from about 0.1 to about 10 weight percent based on the weight of the carbon tetrahalide reactant.

The concentration of the reactants in the reaction mixture may be varied over a relatively wide range. The carbon monoxide, being somewhat less reactive than the carbon tetrahalide reactant, is generally utilized in a molar excess thereof, usually at least about a 2:1 molar excess. Although in some cases the process of this invention is operable at atmospheric pressure, it is beneficial to employ superatmospheric pressures up to about 2000 atmospheres or more. A pressure in the range of from about 10 to about 2000 atmospheres is suitable.

The process of this invention can be effected in any conventional or otherwise convenient manner and may comprise a batch or a continuous type of operation. For example, when it is desired to prepare the acyl halides batchwise, the selected carbon tetrahalide, saturated hydrocarbon and free radical generating compound are charged to a suitable high pressure reaction vessel embodying adequate heating and mixing means. The vessel is then sealed, preferably flushed with dry nitrogen, and then brought to the desired initial pressure by means of carbon monoxide charged thereto. The vessel contents are heated at reaction temperature for a suitable period, say from about 0.1 to about 10 hours or more. Since carbon monoxide is consumed in the reaction, progress of the reaction can be ascertained with reference to pressure. It may be desired to maintain a constant pressure by a continuous or intermittent addition of carbon monoxide to the reaction vessel. Upon completion of the reaction the vessel is cooled and excess carbon monoxide is discharged. The desired reaction product is recovered from the reaction mixture by distillation methods or other suitable means known in the art.

The preferred method of operation is of the continuous type. In this type of operation the reactants and the free radical generating compound are continuously charged to a reactor maintained at suitable conditions of temperature and pressure. The reactor may be an unpacked vessel or coil, or it may contain an adsorbent packing material such as firebrick, alumina, dehydrated bauxite, and the like. The products are separated from the reactor effluent and the unconverted reactants may be recycled to the reaction zone.

The following examples are presented in illustration of the process of this invention. It is not intended that said examples be interpreted as an undue limitation on the generally broad scope of this invention as set out in the appended claims.

*Example I*

One hundred grams of n-heptane, 42 grams of carbon tetrachloride and 5 grams of benzoyl peroxide were placed in a glass liner and inserted in a rotatable steel autoclave of 850 cubic centimeters capacity. The autoclave was flushed with dry nitrogen and sealed. Carbon monoxide was pressured into the sealed autoclave to bring the initial pressure to 90 atmospheres at room temperature. The autoclave was rotated and heated at a temperature of 90° C. over a 4 hour period; the maximum pressure reached 110 atmospheres. Thereafter, the autoclave was cooled, the final pressure at room temperature being 85 atmospheres. Excess carbon monoxide was discharged and the liquid reaction mixture recovered from the autoclave and subjected to fractional distillation at reduced pressure. About a 24% yield of octanoyl chloride, largely 2-methyl-heptanoyl chloride, was recovered. The product was identified by nuclear magnetic resonance analysis methods and by formation of the corresponding methyl ester and anilide by treatment with methanol and aniline, respectively.

*Example II*

Cyclohexanecarbonyl chloride was prepared by heating a mixture of cyclohexane, 103 grams; carbon tetrachloride, 77 grams; and carbon monoxide together with 8 grams of benzoyl peroxide utilizing the apparatus and procedure of Example I. The initial carbon monoxide pressure at room temperature was 50 atmospheres. The autoclave was rotated and heated at a temperature of 80–110° C. over a 5.5 hours period; the maximum pressure was 63 atmospheres. The final pressure at room temperature was 45 atmospheres. Carbon monoxide was discharged and the liquid reaction mixture subjected to fractional distillation at reduced pressure. A 30% yield of cyclohexanecarbonyl chloride was recovered and identified by nuclear magnetic resonance analysis methods.

*Example III*

Tetradecane was converted to tetradecanecarbonyl chloride by heating a mixture of tetradecane, 201 grams; carbon tetrachloride, 77 grams; and carbon monoxide together with 5 grams of benzoyl peroxide. The initial carbon monoxide pressure at room temperature was 50 atmospheres. The autoclave was rotated and heated at a temperature of 90° C. over a period of 16 hours during which time the maximum pressure attained was 60 atmospheres. The final pressure at room temperature was 40 atmospheres. Carbon monoxide was discharged and a liquid reaction mixture subjected to fractional distillation at reduced pressure. The 19% yield of tetradecanecarbonyl chloride was recovered and identified by nuclear magnetic resonance analysis methods.

*Example IV*

The chlorocarbonylation product of 2,2,4-trimethylpentane was prepared by heating a mixture of 2,2,4-trimethylpentane, 118 grams; carbon tetrachloride, 50 grams; and carbon monoxide together with 5 grams of lauroyl peroxide. The initial carbon monoxide pressure at room temperature was 50 atmospheres. The autoclave was rotated and heated at a temperature of 70–75° C. over a period of 16 hours. The maximum pressure attained at 70° C. was only 70 atmospheres because the pressure dropped fairly rapidly during the heating period. The final pressure at room temperature was 42 atmospheres. Carbon monoxide was discharged and the liquid reaction mixture subjected to fractional distillation at reduced pressure. About a 6% yield of the chlorocarbonylation product was recovered and identified by nuclear magnetic resonance analysis methods.

*Example V*

Heating a mixture of 100 grams of methylcyclohexane, 58 grams of carbon tetrachloride and 4 grams of lauroyl peroxide at 70 to 78° C. for 8 hours under 50 atmospheres initial carbon monoxide resulted in an 8% yield of methylcyclohexanecarbonyl chloride isomers. It yielded an amide melting at 150° C., indicating that 2-methylcyclohexanecarbonyl chloride was a major component of the product.

*Example VI*

One hundred grams of n-heptane, 77 grams of carbon tetrachloride and 4 grams of di-t-butyl peroxide was heated together with carbon monoxide. The initial carbon monoxide pressure at room temperature was 32 atmospheres. The autoclave was rotated and heated at a temperature of 130–140° C. over a 5 hour period during which the pressure attained a maximum of 38 atmospheres. The final pressure at room temperature was 14 atmospheres. Carbon monoxide was discharged and the liquid product subjected to fractional distillation at reduced pressure. Octanoyl chloride was obtained although the principal product was octanoic acid, chiefly 2-methylheptanoic acid.

I claim as my invention:

1. A process for the chlorocarbonylation of a saturated hydrocarbon which comprises reacting carbon tetrachloride, carbon monoxide and a saturated hydrocarbon containing more than 2 carbon atoms by heating a mixture of the same together with an organic peroxide at a temperature at least as high as the decomposition temperature of said peroxide and at a superatmospheric pressure.

2. A process for the chlorocarbonylation of an aliphatic saturated hydrocarbon which comprises reacting carbon tetrachloride, carbon monoxide and an aliphatic saturated hydrocarbon containing more than 2 carbon atoms by heating a mixture of the same together with an organic peroxide at a temperature at least as high as the decomposition temperature of said peroxide and at a superatmospheric pressure.

3. A process for the chlorocarbonylation of an alicyclic saturated hydrocarbon which comprises reacting carbon tetrachloride, carbon monoxide and an alicyclic saturated hydrocarbon containing more than 2 carbon atoms by heating a mixture of the same together with an organic peroxide at a temperature at least as high as the decomposition temperature of said peroxide and at a superatmospheric pressure.

4. A process for the chlorocarbonylation of a saturated hydrocarbon which comprises reacting carbon tetrachloride, carbon monoxide and a saturated hydrocarbon containing more than 2 carbon atoms by heating a mixture of the same together with an organic peroxide at a temperature of from about 50° C. to about 300° C. and at least as high as the decomposition temperature of said organic peroxide and at a pressure of from about 10 to about 2000 atmospheres.

5. A process for the chlorocarbonylation of a saturated hydrocarbon which comprises reacting carbon tetrachloride, carbon monoxide and a saturated hydrocarbon containing more than 2 carbon atoms by heating a mixture of the same together with an acyl peroxide at a temperature of from about 50° C. to about 300° C. and at least as high as the decomposition temperature of said acyl peroxide and at a pressure of from about 10 to about 2000 atmospheres.

6. A process for the chlorocarbonylation of a saturated hydrocarbon which comprises reacting carbon tetrachloride, carbon monoxide and a saturated hydrocarbon containing more than 2 carbon atoms by heating a mixture of the same together with an aroyl peroxide at a temperature of from about 50° C. to about 300° C. and at least as high as the decomposition temperature of said aroyl peroxide and at a pressure of from about 10 to about 2000 atmospheres.

7. A process for the chlorocarbonylation of n-heptane which comprises reacting carbon tetrachloride, carbon monoxide and n-heptane by heating a mixture of the same together with benzoyl peroxide at a temperature of from about 75° C. to about 225° C. at a pressure of from about 10 to about 2000 atmospheres.

8. A process for the chlorocarbonylation of tetradecane which comprises reacting carbon tetrachloride, carbon monoxide and tetradecane by heating a mixture of the same together with benzoyl peroxide at a temperature of from about 75° C. to about 225° C. at a pressure of from about 10 to about 2000 atmospheres.

9. A process for the chlorocarbonylation of cyclohexane which comprises reacting carbon tetrachloride, carbon monoxide and cyclohexane by heating a mixture of the same together with benzoyl peroxide at a temperature of from about 75° C. to about 225° C. at a pressure of from about 10 to about 2000 atmospheres.

10. A process for the chlorocarbonylation of 2,2,4-trimethylpentane which comprises reacting carbon tetrachloride, carbon monoxide and 2,2,4-trimethylpentane by heating a mixture of the same together with lauroyl peroxide at a temperature of from about 65° C. to about 215° C. at a pressure of from about 10 to about 2000 atmospheres.

11. A process for the chlorocarbonylation of methylcyclohexane which comprises reacting carbon tetrachloride, carbon monoxide and methylcyclohexane by heating a mixture of the same together with lauroyl peroxide at a temperature of from about 65° C. to about 215° C. at a pressure of from about 10 to about 2000 atmospheres.

References Cited

FOREIGN PATENTS 581,278  10/1946  Great Britain.

OTHER REFERENCES

West et al.: J. Amer. Chem. Soc., vol. 72 (1950), pp. 3525–7.

ALEX MAZEL, *Primary Examiner.*

R. J. GALLAGHER, *Assistant Examiner.*